United States Patent [19]

Fukunaga et al.

[11] Patent Number: 4,943,084
[45] Date of Patent: Jul. 24, 1990

[54] ACTIVELY CONTROLLED SUSPENSION SYSTEM FOR SUPPRESSING ATTITUDE CHANGE OF VEHICULAR BODY

[75] Inventors: Yukio Fukunaga; Naoto Fukushima; Yohsuke Akatsu; Sunao Hano; Masaharu Satoh, all of Kanagawa, Japan

[73] Assignee: Nissan Motor Company, Limited, Yokohama, Japan

[21] Appl. No.: 255,560

[22] Filed: Oct. 11, 1988

[30] Foreign Application Priority Data

Oct. 9, 1987 [JP] Japan .................................. 62-255744

[51] Int. Cl.⁵ .............................................. B60G 11/26
[52] U.S. Cl. ..................................... 280/707; 280/703
[58] Field of Search ................ 280/707, 711, 714, 703

[56] References Cited

U.S. PATENT DOCUMENTS 3,992,039 11/1976 Hiruma ................................. 280/703
4,702,490 10/1987 Yamaguchi et al. ................ 280/707
4,743,000 5/1988 Karnopp ............................... 280/707
4,763,222 8/1988 Heaston et al. ...................... 280/707
4,763,745 8/1988 Eto et al. .............................. 280/707

FOREIGN PATENT DOCUMENTS 0193124 9/1986 European Pat. Off. .

*Primary Examiner*—Richard A. Bertsch
*Attorney, Agent, or Firm*—Foley & Lardner, Schwartz, Jeffery, Schwaab, Mack, Blumenthal & Evans

[57] ABSTRACT

A suspension control system detects acceleration exerted on the vehicular body and close to a predetermined critical value. When the acceleration greater than the predetermined critical value, total stiffness of the suspension system is adjusted to be smaller value to allow attitude change of the vehicle body in a predetermined magnitude. Therefore, rolling or pitching is caused as a sign that traction of the suspension tends to break. This makes a driver to recognize that the vehicular driving condition is near the critical condition.

11 Claims, 7 Drawing Sheets

ACTIVELY CONTROLLED SUSPENSION SYSTEM FOR SUPPRESSING ATTITUDE CHANGE OF VEHICULAR BODY

BACKGROUND OF THE INVENTION

1. Field of the Invention

The present invention relates generally to an actively controlled automotive suspension system, in which suspension characteristics is adjusted in active manner for suppressing attitude change of a vehicle body. More particularly, the invention relates to an actively controlled suspension system which performs anti-rolling and/or anti-pitching suspension control depending upon the vehicle driving condition. Further particularly, the invention relates to an actively controlled suspension system which make a vehicular driver to easily recognize critical vehicular driving condition during cornering and/or braking and thus avoid to cause sudden break of suspension which brings significant change of vehicular attitude.

2. Description of the Background Art

The U.S. Pat. No. 4,702,490, issued on Oct. 27, 1987, to Hirotsugu YAMAGUCHI et al., and assigned to the common assignee to the present invention, discloses an actively or positively controlled automotive suspension system which includes hydraulic cylinder for generating variable damping force against relative motion of a vehicular suspension member and a vehicle body in bounding and rebounding directions for adjusting suspension characteristics and adjusting vehicle body attitude.

Similar type actively controlled suspension systems has been disclosed in the U.S. Pat. No. 4,801,155 assigned to the common assignee to the present invention, European Patent First Publications Nos. 02 49 246 and 02 49 209 respectively corresponding to co-pending U.S. Pat. Applications Ser. Nos. 061,368 (filed on June 15, 1987) and 059,888, filed on June 9, 1987, both of which have been assigned to the common assignee to the present invention. The later-mentioned three inventions include features of anti-rolling and/or anti-pitching suspension control for adjusting damping characteristics at respective vehicular wheel for suppressing vehicular rolling motion.

Furthermore, U.S. Pat. No. 4,865,347, U.S. Pat. No. 4,888,696 and U.S. Pat. No. 4,872,701 are also assigned to the common assignee to the present invention. These co-pending applications disclose actively controlled suspension systems which are provided variable suspension characteristics with variable sensibility for vehicular body attitude change.

Such prior proposed suspension control systems are satisfactorily systems for achieving riding comfort and driving stability and for successfully suppressing attitude change. However, despite effectiveness in anti-rolling and anti-pitching control in the prior proposed suspension control systems, vehicular suspension tends to break traction to cause uncontrollable attitude change when acceleration, i.e. lateral or longitudinal acceleration, exerted on the vehicle body becomes greater than a predetermined value which may be determined according to setting of suspension of respective individual vehicles. As long as the anti-rolling and anti-pitching control are effective in the suspension control system, the driver cannot recognize that he is driving the vehicle near the vehicular critical condition, i.e. the acceleration exerted on the vehicular body being large enough to be near mechanical and/or hydraulical setting of the suspension system until suspension breaks traction. Breakage of traction causes sudden and substantial change of vehicular attitude to make the vehicle unstable condition.

SUMMARY OF THE INVENTION

It is an object of the present invention to provide an anti-rolling and anti-pitching suspension control system which makes a driver to recognize that he is driving in a condition close to critical condition.

In order to achieve the aforementioned and other objects, a suspension control system according to the present invention, detects acceleration exerted on the vehicular body and close to a predetermined critical value. When the acceleration greater than the predetermined critical value, total stiffness of the suspension system is adjusted to be smaller value to allow attitude change of the vehicle body in a predetermined magnitude. Therefore, rolling or pitching is caused as a sign that traction of the suspension tends to break. This makes a driver to recognize that the vehicular driving condition is near the critical condition.

According to one aspect of the invention, a control system for an automotive suspension system for controlling vehicular attitude comprises:

a suspension system disposed between a vehicle body and a suspension member which rotatably supports a vehicular wheel, the suspension system having a variable pressure chamber filled with a working fluid of controlled pressure a pressure adjusting means, associated with the variable pressure chamber, for adjusting the pressure of the working fluid in the pressure chamber a sensor means monitoring acceleration causing vehicular attitude change to produce a first sensor signal indicative of the measured acceleration a control unit receiving the first sensor signal, deriving suspension control signal value on the basis of the first sensor signal for suppressing attitude change, the control unit outputting a control signal to control the pressure adjusting means for adjusting suspension characteristics to suppress vehicular attitude change, the control unit being responsive to the first sensor signal representative of an acceleration greater than a predetermined value for deriving the suspension control signal to allow a given magnitude of attitude change.

According to another aspect of the invention, an anti-roll control system for an automotive suspension system for suppressing vehicular rolling, comprises:

a suspension system disposed between a vehicle body and a suspension member which rotatably supports a vehicular wheel, the suspension system having a variable pressure chamber filled with a working fluid of controlled pressure a pressure adjusting means, associated with the variable pressure chamber, for adjusting the pressure of the working fluid in the pressure chamber a sensor means monitoring lateral acceleration causing vehicular rolling to produce a lateral acceleration indicative sensor signal a control unit receiving the first sensor signal, deriving suspension control signal value on the basis of the first sensor signal for suppressing rolling, the control unit outputting a control signal to control the pressure adjusting means for adjusting damping characteristics to suppress vehicular rolling, the control unit being responsive to the first sensor signal representative of lateral acceleration greater than a predetermined value which represents the lateral acceleration close to a critical acceleration for deriving the suspension control signal to allow a given magnitude of rolling.

According to a further aspect of the invention, an anti-pitching control system for an automotive suspension system for suppressing vehicular pitching, comprising:

a suspension system disposed between a vehicle body and a suspension member which rotatably supports a vehicular wheel, the suspension system having a variable pressure chamber filled with a working fluid of controlled pressure a pressure adjusting means, associated with the variable pressure chamber, for adjusting the pressure of the working fluid in the pressure chamber a sensor means monitoring longitudinal acceleration causing vehicular pitching to produce a longitudinal acceleration indicative sensor signal a control unit receiving the first sensor signal, deriving suspension control signal value on the basis of the first sensor signal for suppressing pitching, the control unit outputting a control signal to control the pressure adjusting means for adjusting damping characteristics to suppress vehicular pitching, the control unit being responsive to the first sensor signal representative of longitudinal acceleration greater than a predetermined value which represents the longitudinal acceleration close to a critical acceleration for deriving the suspension control signal to allow a given magnitude of pitching.

The control unit increases the magnitude attitude change according to increasing of the acceleration when the acceleration is greater than the predetermined value. In the preferred construction, the control unit comprises a coefficient generator means for generating a coefficient variable depending upon the acceleration, which coefficient is maintained at a preset greatest value while the acceleration is smaller than or equal to the predetermined value and decreases in a manner inversely proportional to acceleration when the acceleration is greater than the predetermined value, and the control unit derives the suspension control signal value on the basis of the acceleration representing first sensor signal value and the coefficient.

The sensor means may monitor lateral and/or longitudinal acceleration exerted on the vehicular body and the control unit performed suspension control for suppressing vehicular rolling and/or pitching.

DESCRIPTION OF THE PREFERRED EMBODIMENT

Figure 1:
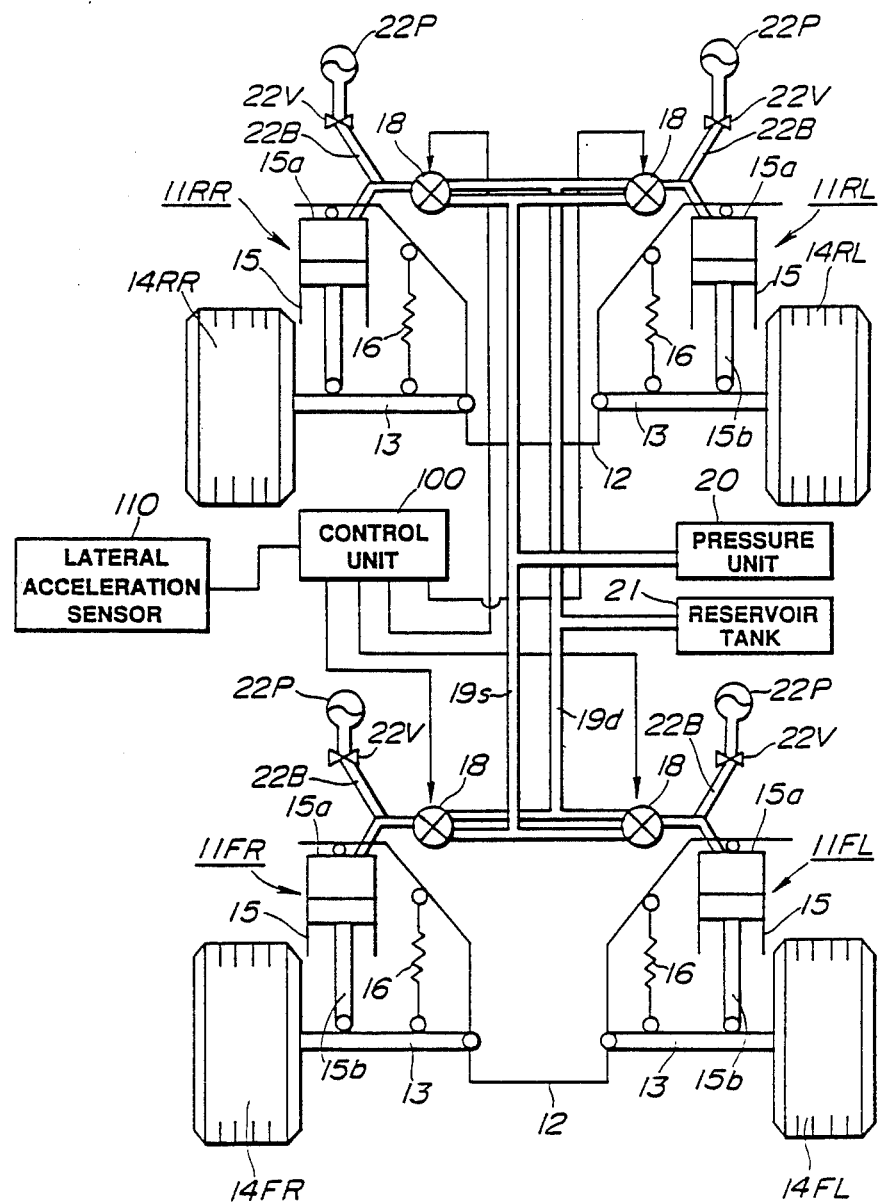
FIG. 1 is a schematic illustration of general construction of an actively controlled suspension system

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator for generating damping force against bounding and rebounding motion between the vehicle body and the suspension member, and a coil spring 16.

It should be appreciated that, in the shown embodiment, the coil spring 16 is not necessary to damp dynamic kinetic energy and should resiliently support only static load to be exerted between the vehicle body and the suspension member. However, it should be, of course, possible to employ the coil spring which can be strong enough to damp part of dynamic kinetic energy in relative bounding and rebounding motion of the vehicle body and the suspension member.

The hydraulic cylinder 15A has a hollow cylinder housing 15$a$ filled with a viscous working fluid and a piston 15$c$ sealingly and thrustingly disposed within the internal space of the cylinder housing to divide the cylinder space into upper and lower fluid chambers 15$d$ and 15$e$. A piston rod 15$b$ extends through one end of the cylinder housing 15$a$. The other end of the cylinder housing 15$a$ is connected to one of the vehicle body 12 and the suspension member 13. On the other hand, the end of the piston rod 15$b$ is connected to the other of the vehicle body 12 and the suspension member 13.

The hydraulic cylinder 15A of the suspension assembly 15 is connected to a hydraulic pressure source unit 20 via a hydraulic circuit which includes pressure control valve 18. The pressure control valve 18 is electrically operable and connected to a microprocessor-based control unit 100. The hydraulic circuit 19 includes a supply line 19$s$ and a drain line 19$d$. The pressure source unit generally comprises a pressure unit 20 and a reservoir tank 21. The pressure unit 20 is connected to the reservoir tank 21 to suck the viscous working fluid in the reservoir tank 21 to feed to the pressure control valve 18 via the supply line 19$s$. On the other hand, the drain line 19$d$ is connected to the reservoir 21 to return the working fluid thereto.

As seen from FIG. 1, a pressure accumulators 22P are communicated with the upper fluid chamber 15d of the hydraulic cylinder 15A via a pressure line 22B. A throttle valve 22V is inserted between the upper fluid chamber 15d and the pressure accumulator 22P. In the shown embodiment, the throttle valve 22V has a fixed throttling rate.

Figure 2:
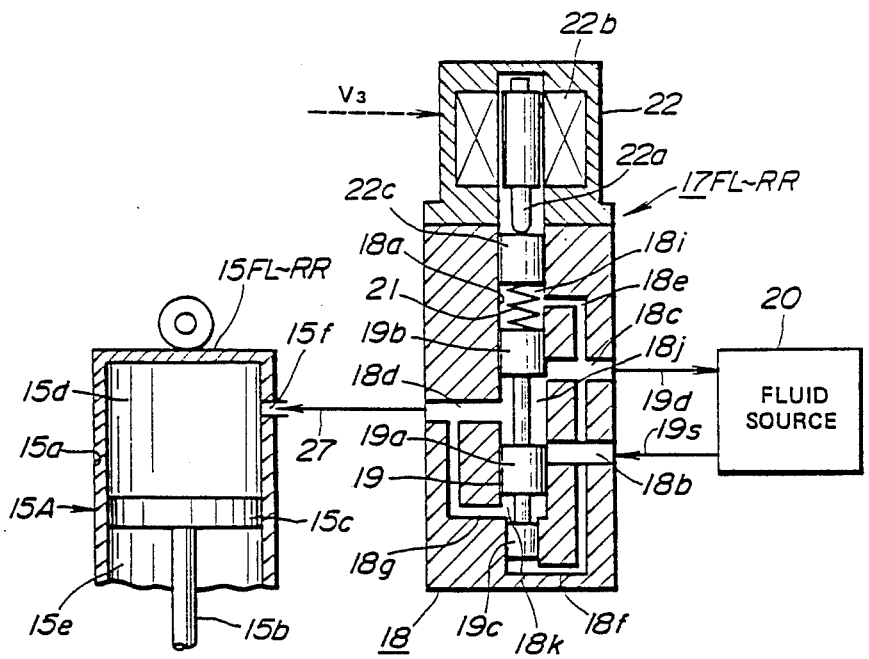
FIG. 2 is a sectional view of a pressure control valve assembly to be employed in the preferred embodiment of the actively controlled suspension system according to the invention FIGS. 3($a$ and 3($b$) are sectional view similar to FIG. 2, but showing the condition where a piston in the pressure control valve assembly is shifted downwardly for reducing fluid pressure in a fluid chamber of a hydraulic cylinder in the suspension system and upwardly to increase the fluid pressure in the fluid chamber FIG. 4 is a graph showing variation of the fluid pressure in a hydraulic cylinder as controlled by the pressure control valve assembly of FIG. 2

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. Though FIG. 2 does not show clear construction, the lower fluid chamber 15e is defined as an enclosed space and is filled with the viscous working fluid. The pressure of the working fluid in the lower fluid chamber 15e at an initial position of the piston 15c serves as a reference pressure and per se serves as resistance for downward movement of the piston.

The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. On the other hand, a pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

Figure 3:
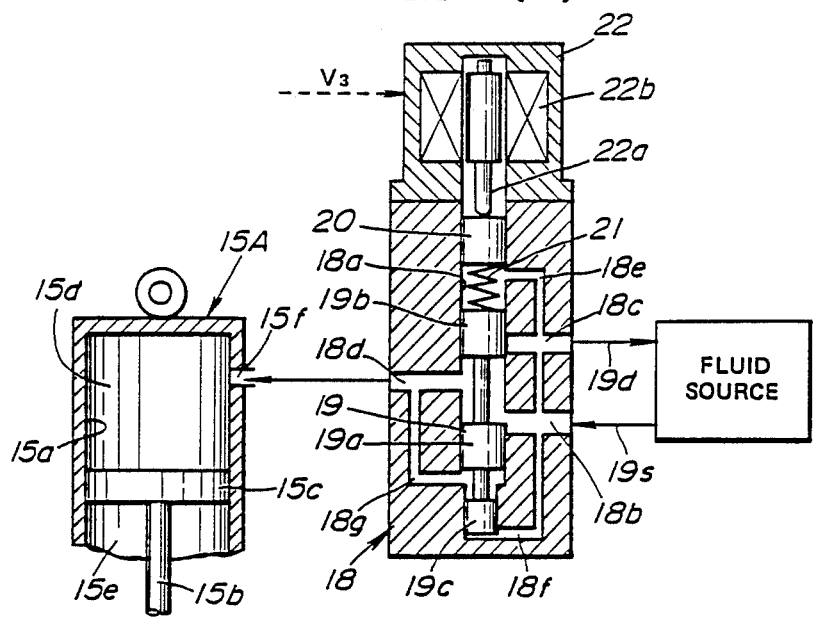
Figure 3:
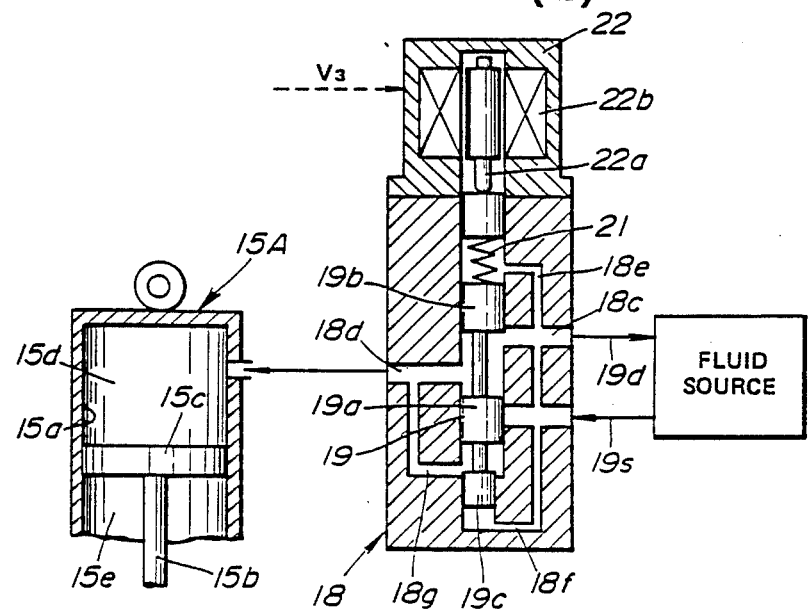

In order to increase the supply pressure of the working fluid, the spool valve 19 is shifted to the position shown in FIG. 3(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 2, 3(A) and 3(B) but can be replaced with any appropriate constructions. For example, the pressure control valve constructions as illustrated in European Patent First Publication No. 01 93 124, set forth above, can also be employed. The disclosure of the aforementioned European Patent First Publication No. 01 93 124 is herein incorporated by reference for the sake of disclosure.

Figure 4:
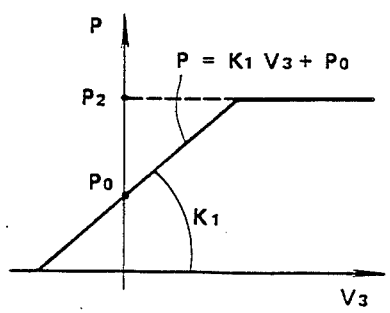

As seen from FIG. 2, the proportioning solenoid 22 comprises the actuator rod 22a and a solenoid coil 22b. The solenoid coil 22b is energized by suspension control signal from the controller 100. In the shown embodiment of the pressure control valve, the working fluid pressure P at the outlet port 18d is variable according to the characteristics shown in FIG. 4. Namely, when the control valve as represented by the suspension control signal is zero, the pressure P at the outlet port 18 becomes $P_0$ determined according to a predetermined offset pressure $P_0$. When the suspension control signal value in positive value increases, the fluid pressure P at the outlet port 18d increases with a predetermined proportioning gain. Namely, by increasing of the suspension control value, the actuator rod 22a is driven downwardly in FIG. 2 at a magnitude toward to position of FIG. 3(A) to achieve increasing of the fluid pressure with the predetermined proportioning gain. The fluid pressure P at the outlet port 18d saturates at the output pressure $P_2$ of the pressure unit 20. On the other hand, when the suspension control signal value $V_3$ decreases, the pressure P decreases to zero to by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes being blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and drain port 18c becomes being blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since no flow resisting element, such as orifice, throttling valve, is disposed between the fluid reservoir 21 and the drain port 18c, no damping force against the upward motion of the piston 15c in the hydraulic cylinder 15A will be produced in response to the bounding motion of the suspension member. Since the damping force exerted on the piston 15c may serves to allow transmission of the part of bounding energy to the vehicle body to cause rough ride feeling, the shown embodiment of the suspension system may provide satisfactorily high level riding comfort by completely absorbing the bounding and rebounding energy set forth above.

Figure 5:
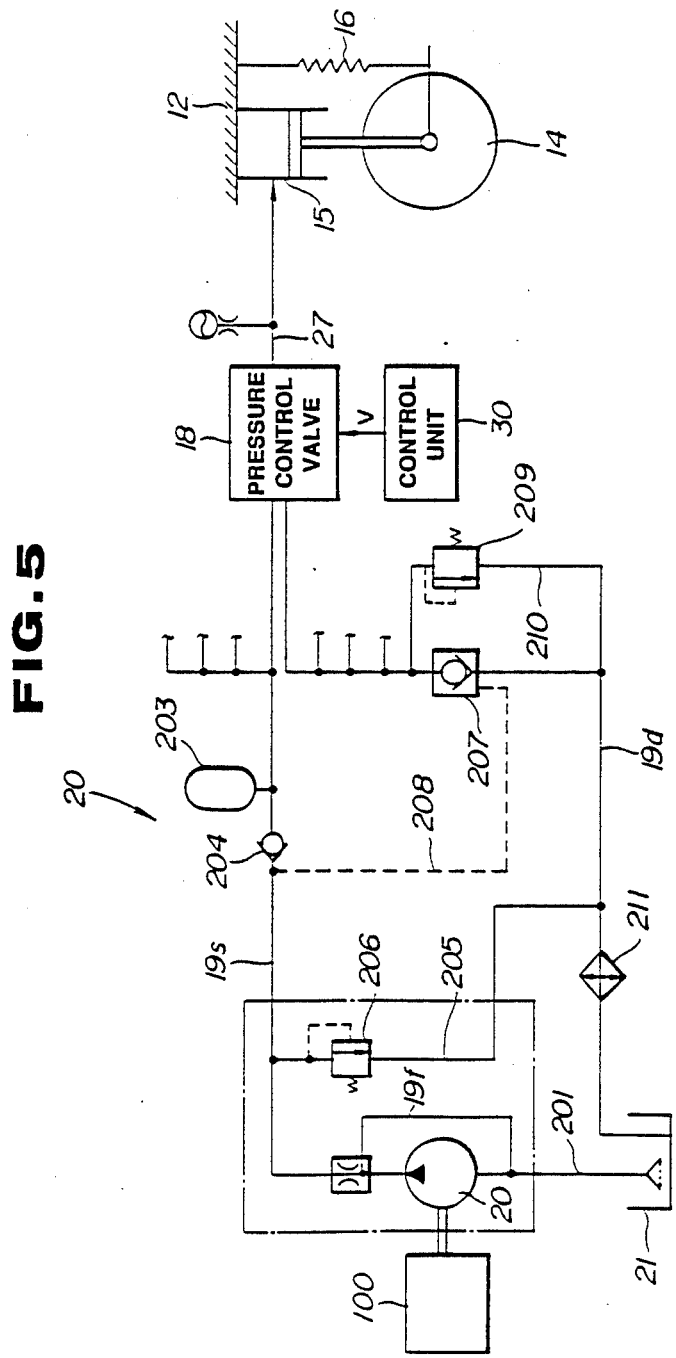
FIG. 5 is a schematical and diagramatical illustration of a hydraulic circuit to be employed for the preferred embodiment of the line pressure control of the invention.

FIG. 5 shows detailed circuit construction of the preferred embodiment of the pressure source unit to be employed in the suspension control system according to the invention. As set forth, the pressure source unit includes the pressure unit 20 which comprises a fluid pump, and is connected to the reservoir 21 via a suction pipe 201 which is driven by means of an automotive engine 200. The outlet of the pressure unit 20, through which the pressurized working fluid is fed, is connected to the inlet port 18b of the pressure control valve 18 via the supply line 19s. A pressure regulating orifice 202 is disposed in the supply line 19s for suppressing pulsatile flow of the working fluid and whereby regulate the output pressure of the pressure unit 20 to be delivered to the pressure control valve 18. A feedback line 19f is connected to the upstream of the pressure regulating orifice 202 at one end. The other end of the feedback line 19f is connected to the upstream of the inlet of the pressure unit 20. Therefore, excessive fluid between the pressure unit 20 and the orifice 202 is fed back to the inlet side of the pressure unit.

A pressure accumulator 203 is also connected to the supply line 19s to receive therefrom the pressurized fluid for accumulating the pressure. An one-way check valve 204 is disposed in the supply line 19s at the position upstream of the junction between the pressure accumulator 203 and the supply 19s.

A pressure relief line 205 is also connected to the supply line 19s at the position intermediate between the pressure regulating orifice 202 and the one-way check valve 204, at one end. The other end of the pressure relief line 205 is connected to the drain line 19d. A pressure relief valve 206 is disposed in the pressure relief line 205. The pressure relief valve 206 is responsive to the fluid pressure in the supply line 19s higher than a give value to drain part of the working fluid to the drain line for maintaining the pressure in the supply line 19s below the given pressure value.

On the other hand, a shut-off valve 207 is disposed in the drain line 19d. The shut-off valve 207 is also connected to the supply line 19s at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 19d may flow therethrough to the reservoir tank 21. On the other hand, the shut-off valve 207 is responsive to the pilot pressure drops below the given pressure level to be switched into shut-off position. At the shut-off position, the shut-off valve blocks fluid communication between the drain port 18c and the reservoir tank 21.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 19d upstream thereof, higher than a set pressure, e.g. 30 kgf/cm$^2$, in order to establish fluid communication between the upstream side and downstream side of the shut-off valve to allow the excessive pressure at the upstream side drain line 19d to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 19d for cooling the working fluid returning to the reservoir tank 21.

Pressurized fluid supply operation to be taken place by the pressure source unit as set forth above will be discussed herebelow.

While the automotive engine 200 is running, the fluid pump as the pressure unit 20 is driven. Therefore, the working fluid in the reservoir tank 21 is sucked via the suction pipe 201 and pressurized through the pressure unit 20. The pressurized working fluid is discharged from the outlet of the pressure unit 20 and fed to the pressure control valve 18 via the supply line 19s including the pressure regulating orifice 202 and the one-way check valve 204. When the pressure control valve 18 in a position of FIG. 3(A), the pressurized working fluid passes the pressure control valve and introduced into the upper fluid chamber 5d of the hydraulic cylinder 15. On the other hand, when the pressure control valve 18 is in the position of FIG. 3(B) to block communication between the supply line 19s and the upper fluid chamber 15d, the line pressure in the supply line increases. When the line pressure in the supply line 19s becomes higher than a set pressure of the pressure relief valve 206 in the pressure relief line 205, the excessive pressure higher than the set pressure is fed to the drain line 19d via the pressure relief valve 206 and thus returned to the reservoir tank 21.

The fluid pressure in the supply line 19s is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 18 and the reservoir tank 21 is maintained. When the pressure control valve 18 is in the position of FIG. 3(B), the working fluid is thus returned to the reservoir tank 21 via the drain line 19d via the shut-off valve 207 and the oil cooler 211.

Since the shut-off valve 207, even at the open position, serves as a resistance to the fluid flow. Therefore, the fluid pressure in the drain line 19d upstream of the shut-off valve 207 becomes excessively higher, i.e. higher than the off-set pressure $P_0$. Then, the pressure relief valve 209 becomes active to open for allowing the excessive pressure of the working fluid to flow through the by-pass line 210.

When the engine 200 stops, the pressure unit 20 cease operation. By stopping of the pressure unit 20, the working fluid pressure in the supply line 19s drops. According to drop of the pressure in the supply line 19s, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 19d upstream of the shut-off valve 207 becomes equal to the pressure in the upper fluid chamber 15d. Therefore, even when the working fluid leaks through a gap between the spool valve 19 and the inner periphery of the valve bore 18a, it will not affect the fluid pressure in the upper fluid chamber 15d.

This is advantageous to maintain the suspension characteristics of the suspension systems irrespective of the engine driving condition.

Figure 6:
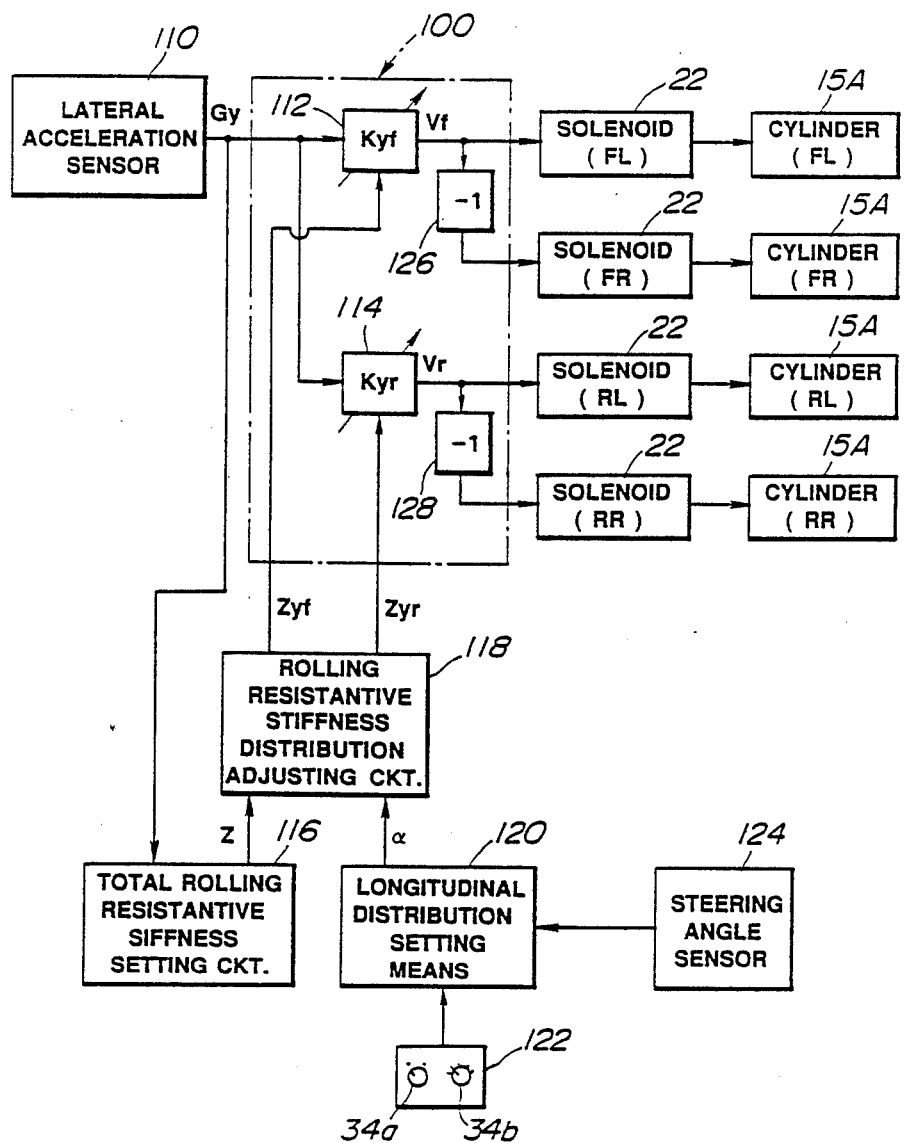
FIG. 6 is a schematic block diagram of the preferred embodiment of suspension control system of FIG. 1

In order to perform control for adjusting suspension characteristics depending upon the vehicle driving condition, the microprocessor-based control unit 100 is provided. The suspension control system including the control unit 100 is illustrated in FIG. 6. The control unit 100, illustrated in FIG. 6 is connected to a lateral acceleration sensor 110 is also provided for monitoring lateral acceleration to be exerted on the vehicle to produce a lateral acceleration indicative signal Gy. The lateral acceleration sensor 110 is connected to a coefficient circuit 112 which comprises a gain controlled amplifier variable of gain Kyf depending on a gain controlling voltage signal Zyf. The lateral acceleration sensor 110 is also connected to a coefficient circuit 114 which comprises a gain controlled amplifier variable of gain Kyr depending on a gain controlling voltage signal Zyr. The lateral acceleration sensor 110 is further connected to a total rolling resistantive moment setting circuit 116.

The total rolling resistantive moment setting circuit 116 is connected to a rolling resistantive moment distribution adjusting circuit 118. The rolling resistantive moment distribution adjusting circuit 118 is connected to a longitudinal distribution setting circuit 120. The longitudinal distribution setting circuit 120 is connected to a manually operable setting means 122 and a steering angular acceleration detecting circuit 124. The steering angular acceleration detecting circuit 124 monitors a steering angular acceleration to produce a steering angular acceleration indicative signal. On the other hand, the manually operable setting means 122 has capability of AUTO/MANUAL selection for selecting operation mode of the lateral distribution setting circuit 120 between AUTO mode in which longitudinal distribution is derived automatically depending upon the magnitude of the steering angular acceleration indicative signal and MANUAL mode in which longitudinal distribution is determined by manually set distribution through the manually operable setting means 122.

In practice, the longitudinal acceleration setting circuit 120 produces proportion $\alpha$ of longitudinal distribution for the front side of the vehicle body. Therefore, the proportion of the longitudinal distribution for the rear side of the vehicular body becomes $(1-\alpha)$.

On the other hand, the total rolling resistantive moment setting means compares the lateral acceleration indicative signal value Gy with a predetermined value, e.g. 0.5 G. When the lateral acceleration indicative signal value Gy is smaller than or equal to the predetermined value, the total rolling resistantive moment indicative value Z is set at a predetermined value $Z_0$. On the other hand, when the lateral acceleration indicative signal value Gy is greater than the predetermined value, the total rolling resistantive moment indicative value decreases at a gradient $\beta$ according to increasing of the lateral acceleration indicative value, as shown in FIG. 7.

The rolling resistantive moment distribution adjusting means derives gain controlling voltage signals Zyf and Zyr on the basis of the rolling resistantive moment indicative value Z input from the total rolling resistantive moment setting means 116, and the longitudinal distribution indicative value $\alpha$, according to the following equations:

$$Zyf + \alpha \times Z$$

$$Zyr + (1-\alpha) \times Z$$

With the gain controlling voltage signals Zyf and Zfr, gains Kyf and Kyr are adjusted. These coefficient circuits 112 and 114 amplifies the lateral acceleration indicative signal Gy from the lateral acceleration sensor 110 with the adjusted gains Kyf and Kyr to produce a front and rear suspension control signals Vf and vr.

The front suspension control signal Vf is fed to the solenoid coil 22b of the solenoid 22 of the pressure control valve 18FL of the front-left suspension. The front suspension control signal Vf is fed to the solenoid coil 22b of the solenoid 22 of the pressure control valve 18FR of the front-left suspension via an inverter 126. The rear suspension control signal Vf is fed to the solenoid coil 22b of the solenoid 22 of the pressure control valve 18RL of the rear-left suspension. The rear suspension control signal Vf is fed to the solenoid coil 22b of the solenoid 22 of the pressure control valve 18RR of the rear-left suspension via an inverter 128.

In the shown embodiment, the lateral acceleration sensor 110 outputs positive value lateral acceleration indicative signal in response to lateral acceleration directed in right and negative value lateral acceleration indicative signal in response to lateral acceleration directed in left.

In the practical operation, the manually operable setting means is manually operated for selecting the desired one of AUTO mode and MANUAL mode. When AUTO mode is selected, the longitudinal distribution indicative value $\alpha$ is derived depending upon the steering angular acceleration indicative signal value from the steering angular acceleration detecting circuit 124. Namely, judgement is made whether the vehicle enters into turning state, the vehicle terminates turning, the vehicle is running in straight on the basis of the steering angular acceleration indicative signal value of the steering angular acceleration detecting circuit 124. Depending upon the steering status, the longitudinal distribution indicative value α is varied in ranges of 0 to 0.5, 0.5 to 1. or a predetermined value which may be set at a value greater than or equal to 0.5.

Assuming the vehicle turns right, right hand lateral acceleration is exerted on the vehicle body and the vehicular body rolls in left. At this time, the hydraulic pressure in the pressure chambers 15d of the hydraulic cylinders 15A of the front-left and the rear-left suspension systems 11FL and 11RL increases to the value greater than the offset pressure $P_0$. On the other hand, the hydraulic pressure in the pressure chambers 15d of the hydraulic cylinders 15A of the front-right and the rear-right suspension systems 11FR and 11RR decreases to the value smaller than the offset pressure $P_0$. These variation of the hydraulic pressures in the hydraulic cylinders serves for maintain the magnitude of attitude change of the vehicular body zero or substantially small. As long as the magnitude of lateral acceleration is maintained smaller than or equal to the predetermined value, e.g. 0.5G, the total rolling suppressive stiffness Z is maintained at an initial value $Z_0$, the rolling angle θ of the vehicle body is maintained zero, as shown in FIG. 8.

Figure 7A:
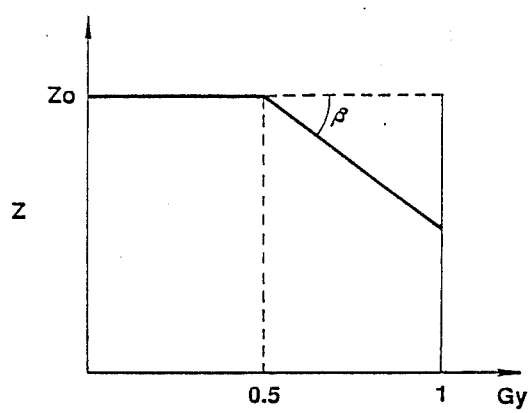
FIGS. 7$a$ and 7$b$ are charts showing variation of a total stiffness Z of vehicular suspension in relation to lateral acceleration exerted on the vehicular body
Figure 7B:
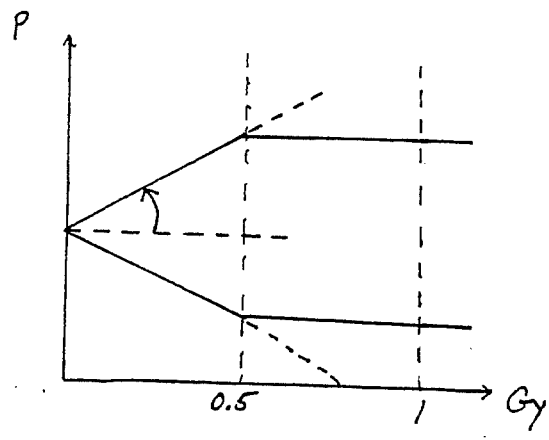
Figure 8:
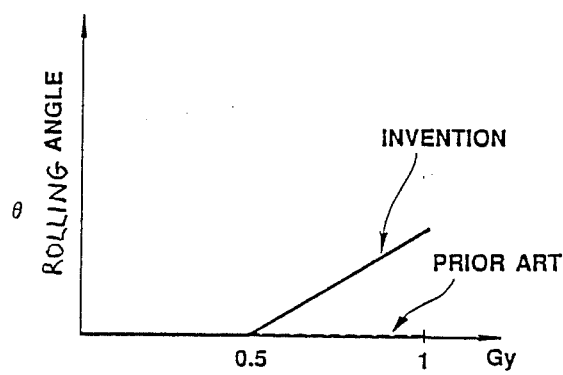
FIG. 8 is a chart showing variation of rolling angle versus lateral acceleration exerted on the vehicular body

As seen from FIGS. 7a, 7b and 8, when the magnitude of lateral acceleration Gy becomes greater than the predetermined value, the total rolling resistantive moment Z decreases at a range β from the initial value $Z_0$. Therefore, the magnitude of vehicular rolling increases according to increasing of the lateral acceleration. This makes the driver to recognize that the vehicular driving condition is near critical condition for causing substantial attitude change before it actually occur.

In addition, by adjusting the stiffness distribution between the front and rear suspension systems as set forth above, the vehicular steering characteristics can be adjusted. Namely, when the suspension control signal value vf for the front suspension systems 11FL and 11FR is greater than that Vr for the rear suspension systems 11RL and 11RR, proportion of rolling resistance at the front suspensions becomes greater than that of the rear suspension systems to cause greater lateral offset of the load. Thus cornering force at the front suspension systems becomes smaller than that at the rear suspension systems to increase the stability factor. This provides under-steering characteristics for the vehicle. Contrary to the above, when the suspension control signal value Vr for the rear suspension systems 11RL and 11RR is greater than that Vf for the front suspension systems 11FL and 11FR, proportion of rolling resistance at the rear suspensions becomes greater than that of the front suspension systems to cause greater lateral offset of the load. Thus cornering force at the rear suspension systems becomes smaller than that at the front suspension systems to decrease the stability factor. This provides over-steering characteristics for the vehicle. When the suspension control signal value Vf is equal to Vr, neutral steering characteristics can be provided. FIG. 7b shows practical variation of pressure (P) corresponding to variation of $Z_0$ as shown in FIG. 7a.

Though the shown embodiment employs the lateral acceleration sensor for monitoring the lateral acceleration exerted on the vehicle body, it may be possible to arithmetically derive or assume the lateral acceleration on the basis of the steering angular position and a vehicle speed.

Figure 9:
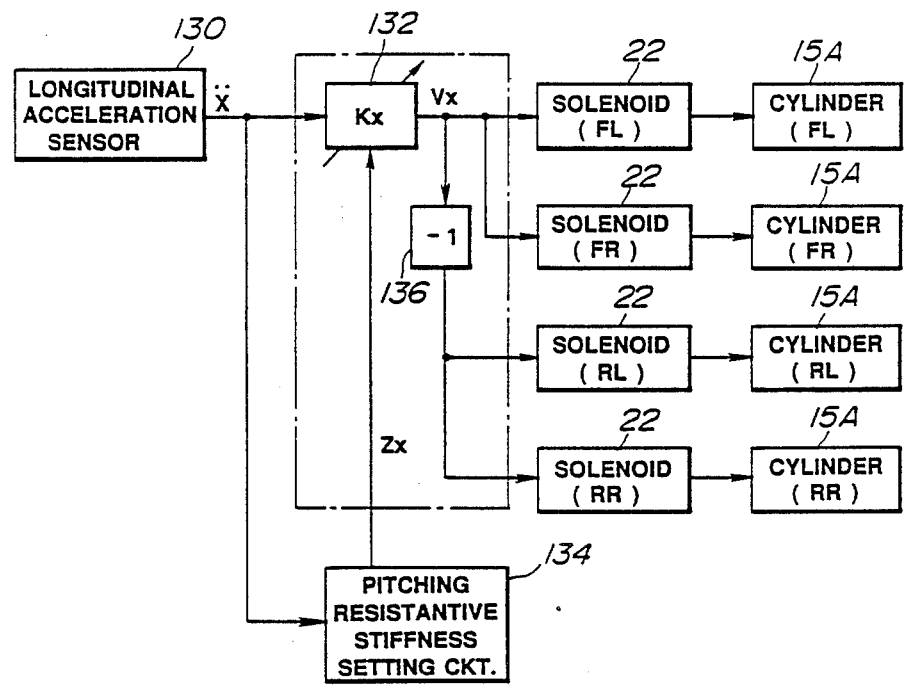
FIG. 9 is a schematic block diagram of another embodiment of suspension control system of FIG. 1, which performs anti-pitching suspension control.

FIG. 9 shows another embodiment of the suspension control system according to the present invention. In this embodiment, the suspension control system performs anti-pitching control on the basis of the longitudinal acceleration Gx. For monitoring the longitudinal acceleration exerted on the vehicular body, a longitudinal acceleration sensor 130 is provided. The longitudinal acceleration sensor 130 is connected to a coefficient circuit 132 which comprises a gain controlled amplifier having an amplifier gain Kx variable depending upon a gain controlling voltage Zx.

The longitudinal acceleration sensor 130 is also connected to a pitching resistantive moment setting circuit 134. The pitching resistantive moment setting circuit 134 is set at an initial stiffness value and designed to output the gain controlling voltage signal corresponding to the initial stiffness value while the longitudinal acceleration is smaller than or equal to a predetermined value. On the other hand, the pitching resistantive moment setting circuit 134 reduces the stiffness value from the initial value according to increasing of the longitudinal acceleration when the longitudinal acceleration is greater than the predetermined value.

As set forth, since the amplifier gain Kx of the gain controlled amplifier 132 is adjusted by the gain controlling voltage signal Zx from the pitching resistantive moment setting circuit 134, value of pitching suppressive suspension control signal Vx varies according to variation of the gain controlling voltage signal Zx.

As seen from FIG. 9, the solenoids 22 of the front suspension systems 11FL and 11FR are directly connected to the coefficient circuit 132 and the solenoids 22 of the rear suspension systems 11RL and 11RR are connected to the coefficient circuit 132 via an inverter 136. Therefore, opposite polarity suspension control signal is applied to the solenoids in the front suspension systems and the rear suspension systems.

The initial value of the pitching resistantive moment is set in the pitching resistantive stiffness setting circuit at a value sufficient for completely suppressing pitching motion, such as nose-dive in deceleration, squat in acceleration and so forth. Therefore, while the longitudinal acceleration is maintained smaller than or equal to the predetermined value, the pitching motion of the vehicular body can be completely suppressed. On the other hand, when the longitudinal acceleration increases across the predetermined value, the stiffness value is decreased to allow a certain magnitude of pitching motion. Since the pitching resistantive moment value is decreased according to increasing of the longitudinal acceleration, magnitude of pitching motion increases according to increasing of the longitudinal acceleration.

Similarly to the foregoing embodiment, this make the driver to recognize that the vehicle driving condition is close to the critical condition.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, the idea of the present invention may be applicable for the suspension control systems disclosed in the aforementioned European Patent First Publications Nos. 0 283 044 and 0 285 153. The disclosure of these European Patent First Publications are herein incorporated by reference.

As will be appreciated herefrom, the present invention fulfills all of the objects and advantages sought therefor.

What is claimed is:

1. A control system for an automotive suspension system for controlling vehicular attitude comprising:
   a suspension system disposed between a vehicle body and a suspension member which rotatably supports a vehicular wheel, said suspension system having a variable pressure chamber filled with a working fluid of controlled pressure
   a pressure adjusting means, associated with said variable pressure chamber, for adjusting the pressure of said working fluid in said pressure chamber
   a sensor means monitoring acceleration causing vehicular attitude chamber to produce a first sensor signal indicative of said measured acceleration
   a control unit receiving said first sensor signal, deriving suspension control signal value on the basis of said first sensor signal for suppressing attitude change, said control unit outputting a control signal to control said pressure adjusting means for adjusting suspension characteristics to suppress vehicular attitude change, said control unit being responsive to said first sensor signal representative of an acceleration greater than a predetermined value for deriving said suspension control signal to allow a given magnitude of attitude change wherein said control unit increases the magnitude of attitude change according to increasing of the accelerator when said acceleration is greater than said predetermined value.

3. A control system for an automotive suspension system for controlling vehicular attitude comprising:
   a suspension system disposed between a vehicle body and a suspension member which rotatably supports a vehicular wheel, said suspension system having a variable pressure chamber filled with a working fluid of controlled pressure a pressure adjusting means, associated with said variable pressure chamber, for adjusting the pressure of said working fluid in said pressure chamber
   a sensor means monitoring acceleration causing vehicular attitude chamber to produce a first sensor signal indicative of said measured acceleration
   a control unit receiving said first sensor signal, deriving suspension control signal value on the basis of said first sensor signal for suppressing attitude change, said control unit outputting a control signal to control said pressure adjusting means for adjusting suspension characteristics to suppress vehicular attitude change, said control unit being responsive to said first sensor signal representative of an acceleration greater than a predetermined value for deriving said suspension control signal to allow a given magnitude of attitude change, wherein said control unit comprises a coefficient generator means for generating a coefficient variable depending upon the acceleration, which coefficient is maintained at a preset greatest value while said acceleration is smaller than or equal to said predetermined value and decreases in a manner inversely proportional to acceleration when the acceleration is greater than said predetermined value, and said control unit derives said suspension control signal value on the basis of said acceleration representing first sensor signal value and said coefficient.

4. An anti-roll control system for an automotive suspension system for suppressing vehicular rolling, comprising:
   a suspension system disposed between a vehicle body and a suspension member which rotatably supports a vehicular wheel, said suspension system having a variable pressure chamber filled with a working fluid of controlled pressure
   a pressure adjusting means, associated with said variable pressure chamber, for adjusting the pressure of said working fluid in said pressure chamber
   a sensor means monitoring lateral acceleration causing vehicular rolling to produce a lateral acceleration indicative sensor signal
   a control unit receiving said first sensor signal, deriving suspension control signal value on the basis of said first sensor signal for suppressing rolling, said control unit outputting a control signal to control said pressure adjusting means for adjusting damping characteristics to suppress vehicular rolling, said control unit being responsive to said first sensor signal representative of lateral acceleration greater than a predetermined value which represents the lateral acceleration close to a critical acceleration for deriving said suspension control signal to allow a given magnitude of rolling.

2. An actively controlled suspension system as set forth in claim 1, wherein said sensor means monitors lateral acceleration exerted on the vehicular body and said control unit performs suspension control for suppressing vehicular rolling.

5. An anti-rolling control system as set forth in claim 4, wherein said control unit increases the magnitude of rolling according to increasing of the acceleration when said acceleration is greater than said predetermined value.

6. An anti-rolling control system as set forth in claim 4, wherein said control unit comprises a coefficient generator means for generating a coefficient variable depending upon the acceleration, which coefficient is maintained at a preset greatest value while said acceleration is smaller than or equal to said predetermined value and decreases in a manner inversely proportional to acceleration when the acceleration is greater than said predetermined value, and said control unit derives said suspension control signal value on the basis of said acceleration representing first sensor signal value and said coefficient.

7. An anti-rolling control system as set forth in claim 4, wherein said sensor means monitors lateral acceleration exerted on the vehicular body and said control unit performed suspension control for suppressing vehicular rolling.

8. An anti-pitching control system for an automotive suspension system for suppressing vehicular pitching, comprising:
   a suspension system disposed between a vehicle body and a suspension member which rotatably supports a vehicular wheel, said suspension system having a variable pressure chamber filled with a working fluid of controlled pressure a pressure adjusting means, associated with said variable pressure chamber, for adjusting the pressure of said working fluid in said pressure chamber a sensor means monitoring longitudinal acceleration causing vehicular pitching to produce a longitudinal acceleration indicative sensor signal a control unit receiving said first sensor signal, deriving suspension control signal value on the basis of said first sensor signal for suppressing pitching, said control unit outputting a control signal to control said pressure adjusting means for adjusting damping characteristics to suppress vehicular pitching, said control unit being responsive to said first sensor signal representative of longitudinal acceleration greater than a predetermined value which represents the longitudinal acceleration close to a critical acceleration for deriving said suspension control signal to allow a given magnitude of pitching.

9. An anti-pitching control system as set forth in claim 8, wherein said control unit increases the magnitude of pitching according to increasing of the acceleration when said acceleration is greater than said predetermined value.

10. An anti-pitching control system as set forth in claim 8, wherein said control unit comprises a coefficient generator means for generating a coefficient variable depending upon the acceleration, which coefficient is maintained at a preset greatest value while said acceleration is smaller than or equal to said predetermined value and decreases in a manner inversely proportional to acceleration when the acceleration is greater than said predetermined value, and said control unit derives said suspension control signal value on the basis of said acceleration representing first sensor signal value and said coefficient.

11. An anti-pitching control system as set forth in claim 8, wherein said sensor means monitors longitudinal acceleration exerted on the vehicular body and said control unit performed suspension control for suppressing vehicular pitching.

* * * * *